UNITED STATES PATENT OFFICE.

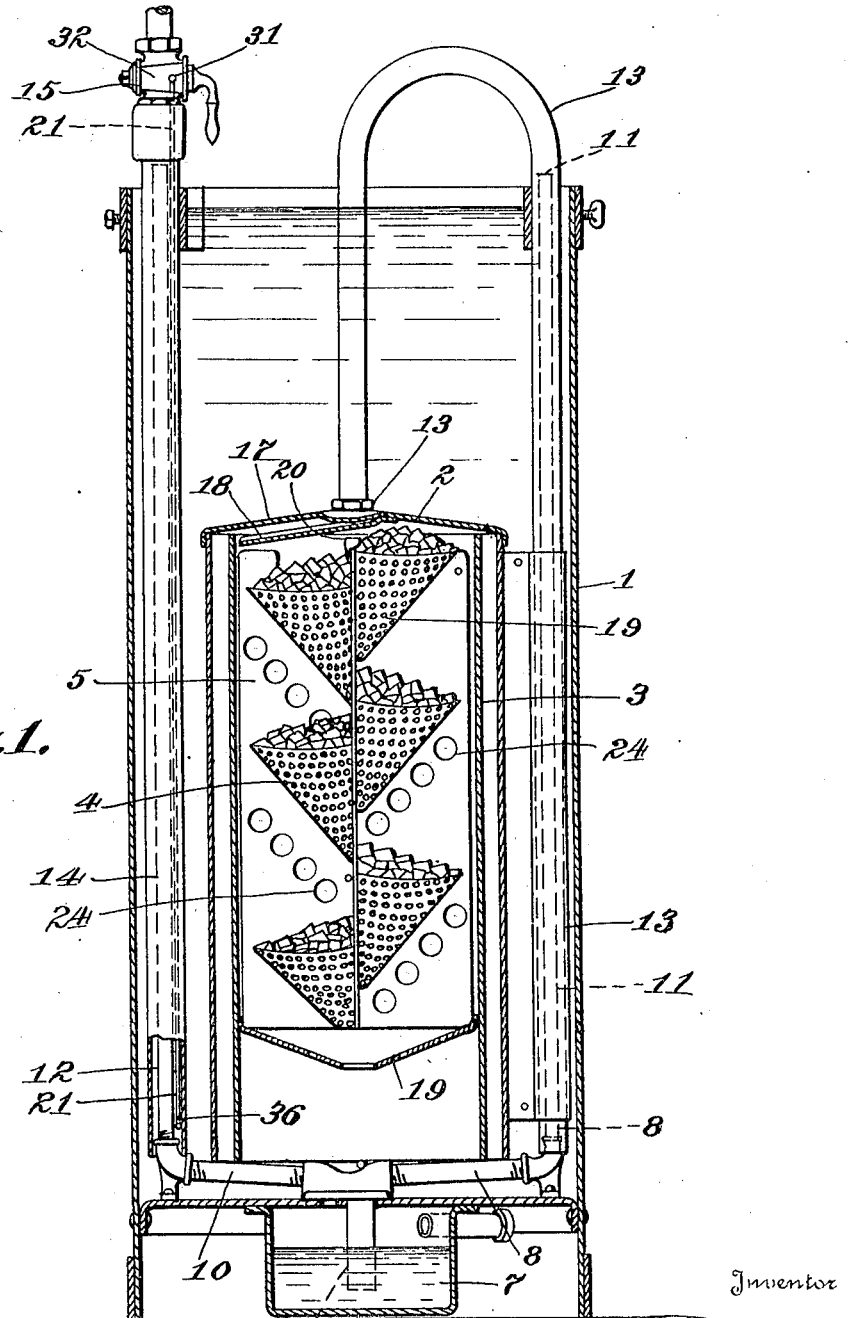

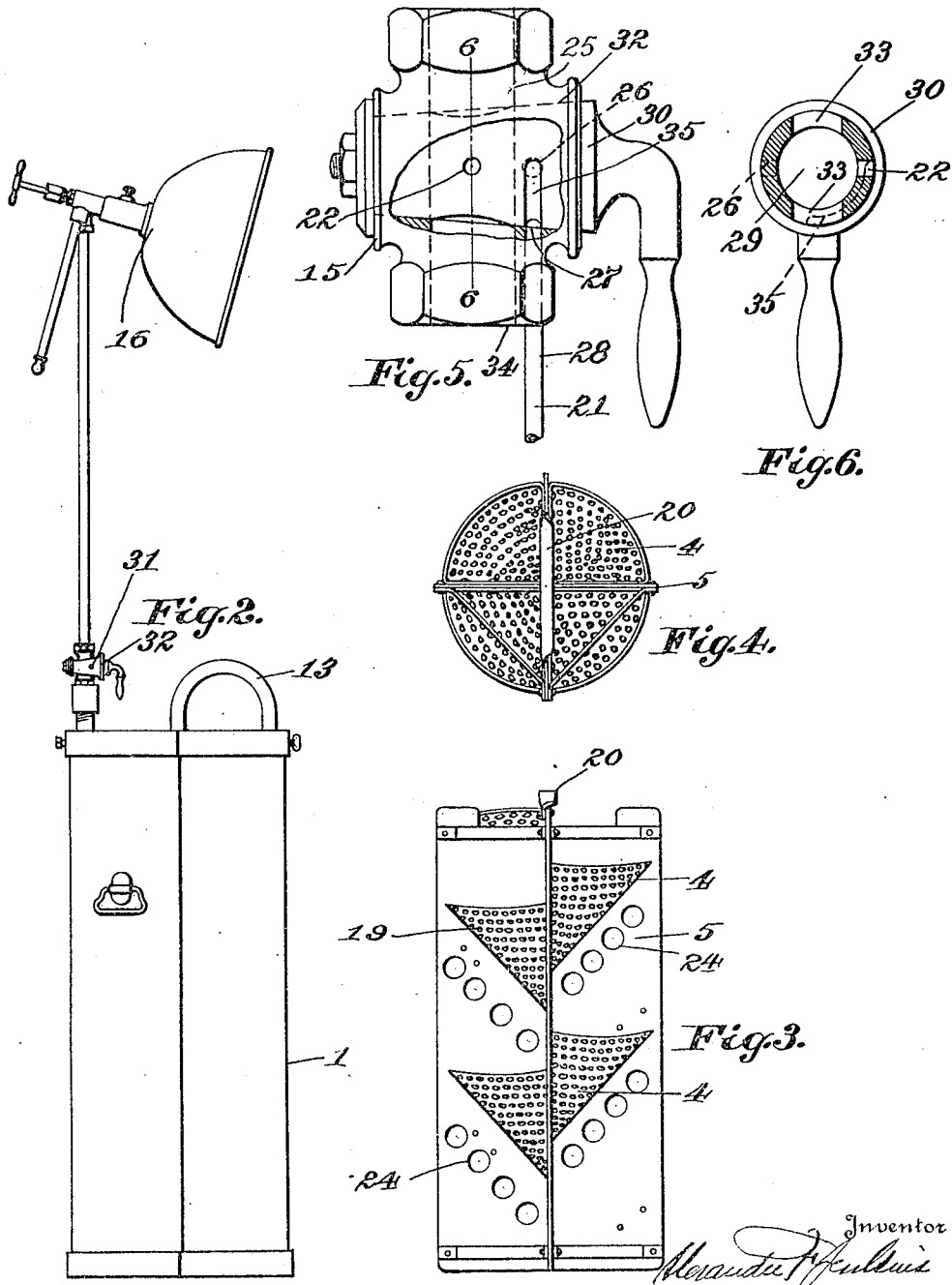

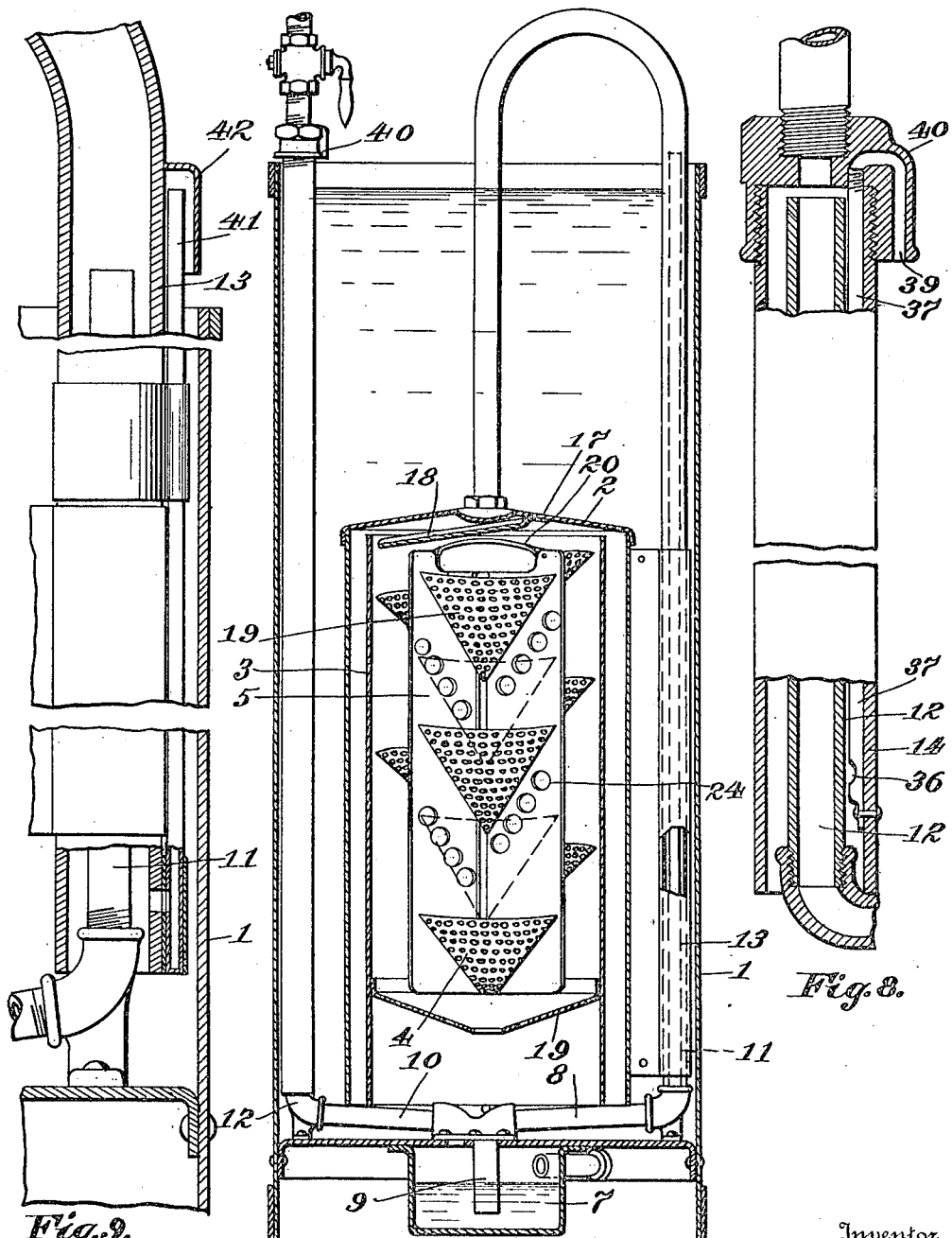

ALEXANDER F. JENKINS, OF BOONE, MARYLAND.

ACETYLENE-GENERATOR.

1,292,327.    Specification of Letters Patent.     Patented Jan. 21, 1919.

Application filed August 3, 1917. Serial No. 184,195.

*To all whom it may concern:*

Be it known that I, ALEXANDER F. JENKINS, a citizen of the United States of America, residing in Boone, Anne Arundel county, Maryland, have invented certain new and useful Improvements in Acetylene-Generators, of which the following is a specification.

This invention relates to an acetylene generator, *i. e.* a generator for producing acetylene gas by the combination of water and calcium carbid.

One of the principal problems in the design of such generators is to effect the regulation of the generation of gas to the consumption without undue loss of the carbid. In some of these generators, the water in regulated quantities is fed to the carbid and in others, the carbid in correspondingly regulated quantities is fed to the water. Particularly in generators of small capacity, making the gas as consumed, it is difficult to so handle the mineral that it can be fed in quantities regulated with sufficient accuracy to give the desired regulation of the gas supply and pressure.

While it is much easier to regulate the feeding of water particularly when gas is to be generated in small quantities than it is the feeding of carbid, it is very difficult to so arrange and control the application of the water to the mineral that generation stops quickly when the withdrawal of the gas from the generator ceases, *i. e.*, to make generation correspond closely to consumption. It has also been found difficult to prevent or keep within reasonable bounds the harmful generation of gas due to dripping of condensed liquid on the carbid, called after generation, and the cleaning out and recharging of the apparatus has been attended with considerable difficulty and inconvenience.

My invention relates to improved features and combinations of features whereby these various difficulties are greatly reduced and, in some instances, entirely eliminated. The invention as illustrated is applied to the type of generator which produces gas for immediate consumption, of course normally maintaining a supply ready for use at any time, as distinguished from the generation of the gas in large quantities for storing in tanks under high pressure, the generator herein illustrated being particularly adapted for use as portable apparatus for illumination in connection with general construction work where gangs of men are employed at night, and any enterprise calling for powerful illumination by portable apparatus. It may also be used as a generator for domestic purposes and in shops. The invention is capable of application to any apparatus in which acetylene gas is made from carbid and water by gradual immersion of the carbid in the water.

The invention consists in a new and improved device for supporting and holding the carbid which combines with other features to produce a new and improved method and means for feeding the water to the carbid and presenting the carbid to the water. This arrangement further results in the quick arresting of generation on cessation of the withdrawal of gas from the generator, and provides liberal circulation through and in the vicinity of the carbid with consequent cooling at and in the vicinity of the point of generation, preventing or reducing polymerization and consequent deterioration of the gas as to its heating and lighting properties.

The invention further provides a new and improved vent which is in a sense a pressure regulating device in that it operates at and determines the maximum pressure intended to exist or to be permitted to be built up in the apparatus, the normal regulation of generation being the main pressure regulating means in this or any such generator.

In addition to these features, the improved apparatus is so constructed as to lead the condensed liquid which forms in the pipes and on the tops of the drums to a point or points where it will fall clear of the carbid supply, preventing after generation.

More particularly, the means for supporting the carbid consists of a pocket, or series of pockets, which pockets in the most highly developed form of the invention are of tapering form with the apex at the bottom, and if in series should be in staggered or helical relation, the term staggered being used in the sense that some of the pockets are out of vertical alinement with others above or below, so that they may overlap in a horizontal plane. Also, in the form of the invention shown, these pockets are supported on or between a series of intersecting and preferably radial plates, the pockets and plates being liberally perforated to provide free circulation, the construction approached being that of a series of wire baskets on a wire frame, the commercial embodiment most easily produced in large quantities being of sheet metal which is easily and quickly stamped and riveted.

The water is fed to the carbid by gravity controlled by the pressure of the gas in the generator, the system being a balanced gravity and pressure system, that is, there is an outer tank or casing which is filled or substantially filled with water. Within this tank or casing is a bell or inverted drum or cylinder open at the bottom having a gas pipe leading from the top of the cylinder to the washer, the pipe being in the form of the invention shown, telescoped and sealed by the water in the tank. Inside the drum is the support for the carbid already described whereby the mineral is held in and presented to the water in suitably regulated quantities. When the generator is started, the pipes and drum are filled with air, this keeps the water from flooding the generator. As soon as the gas cock is opened, the pressure of the water at the bottom of the drum starts the flow of air and as the air escapes, the water rises wetting the bottom of the first carbid container or basket, thus generating a small amount of gas which in turn expels the air and soon the flow of gas from the generator becomes sufficient to support combustion. The generation of gas on the contact of the water with the carbid is immediate and replaces the air to a sufficient extent to prevent undue reduction of pressure and consequent rise of the water with the wetting of excess carbid. It will be understood that this balanced gravity and pressure feed is automatically regulated for when the pressure drops as from withdrawal of gas the water rises wetting additional carbid and when the pressure rises the water is forced down draining the carbid and stopping generation.

The object of the staggered or helical arrangement of the pockets, combined in the most efficient form of the invention with the tapered construction, is to combine with the feeding of water from below the regulation of the amount of carbid to be exposed to the action of the water at each stage of the operation. The horizontal cross-section of material preferably increases slightly toward the top to compensate for the change of water pressure and gas space. This change of cross-section may be accomplished by decreasing the vertical spacing of the pockets toward the top of the series or otherwise. The staggered or helical arrangement thereof and facilitated by their tapered form gives uniformity of generation. The area of carbid wetted increasing first in proportion to the area of horizontal cross-section of the bottom pocket and then preferably increasing slightly as the water rises throughout the operation. It should be understood that the horizontal cross-section of material presented increases very slightly after the middle of the bottom pocket is passed, the object being merely as stated above to compensate for the change of gas space and variation of water pressure. The staggered or spiral arrangement also has the advantage of throwing the different pockets out of vertical alinement so that there is a free space above each for the expansion of the carbid as it is converted by the action of the water. The conical or tapering shape of the pockets has the advantage both that the refuse is easily discharged when they are inverted, and that the large area at the top increases the capacity to support the extra volume of material expanded by the chemical action of the generator, and the reduction at the bottom decreases the volume which must be thus supported by a given area at the top.

After generation is often due to condensation of water and other liquid in the gas pipe and on the top of the drum with consequent dripping of the liquid on the carbid. This is prevented in the present instance by the construction of the top of the drum which provides a downward inclination or depression toward the sides conducting the condensate away from the carbid so that it does not fall on the unused or unwetted material, and the provision of the baffle beneath the end of the pipe.

Regulation of pressure by venting the gas in case generation for some reason is not arrested with sufficient abruptness when the gas is shut off or in case of after generation from some cause which permits the carbid to be wetted when there is no withdrawal of gas for consumption or in case of too rapid generation during consumption, is accomplished by means of a vent which operates at a certain predetermined pressure.

It will be understood that the gas pipe which leads from the washer is telescoped and water-sealed so that the outside pipe, i. e., the space between the inner and the outer pipe is filled with water, the pipe from the generator to the washer being similarly telescoped and sealed to vent the surplus gas above a certain predetermined pressure. I lead a small passage from a point in this annular space, determined by the column of water corresponding to the desired pressure, usually near the bottom, to a convenient point of discharge, usually somewhere on the burner pipe. The vent may be left open or may be in the gas cock, being controlled by a separate set of passages in the valve plug and seat, providing for the discharge of the vented gases both when the valve is open and closed, or only when the valve is closed, as may be desired. It will be understood that the column of water in the annular space between the telescoped pipes leading to the burner, is controlled by the pressure at which the gas is delivered and that as this pressure rises, depressing the column of water, the vent becomes operative.

In the accompanying drawings, I have illustrated an apparatus embodying the various features of my invention in the present commercial form.

Figure 1— is a vertical central section through the generator taken near the axis;

Fig. 2— is an elevation of the complete apparatus;

Fig. 3— is an elevation of the rack with the series of subdivided carbid containers;

Fig. 4— is a plan of the same;

Fig. 5— is a view of the gas cock provided with the vent outlet of the invention in one form;

Fig. 6— is a cross-section of the valve plug on the line 6, 6 of Fig. 5;

Fig. 7— is a view of the apparatus illustrating a modified form of vent; and

Fig. 8— shows still another view of same, and Fig. 9 shows another form.

Referring to the drawings by numerals, the apparatus as shown includes a tank 1, which when the apparatus is first filled prior to the opening of the gas cock is almost full of water, a bell, outside cylinder or drum 2, and an inside cylinder 3 with a carbid container or a series of carbid containers, 4, which in the most highly developed form of my invention taper toward the bottom and are supported on the rack 5, spaced vertically, and preferably in staggered or spiral relation so that the horizontal cross-section through the carbid is substantially equal at all points above the taper of the bottom receptacle or pocket except for the slight regular increase toward the top, and the water in rising, reaches each receptacle before the next preceding one is completely submerged with the result that as the water rises and the carbid is consumed, there is no cessation of gas supply and pressure and the supply is proportionate at all times to the amount withdrawn.

The outer tank 1 as shown, is provided with a closed washer pocket 7. To this is connected the gas supply pipe 8, the end of which at 9 dips below the water in the washer pocket 7, and the gas delivery pipe 10. Each of these pipes extends from the pocket to the side of the tank 1 near the bottom where there is an elbow and each terminates in a straight, vertical length of pipe 11, 12, which telescopes within a second pipe 13, inclosing the vertical pipe 11 and connecting it to the drum 2 at the top, and 14 inclosing the pipe 12 and connecting it to the valve cock 15 and the burner or other point of consumption 16.

The drum 2 might be more properly described as a bell, the bottom being open, and the water excluded therefrom by the air or gas pressure corresponding to and balancing the hydraulic pressure at this point. The bell or drum 2 rests on any suitable supports which in the present instance may be the elbows or horizontal portions of the gas pipes 8, 9. One of the refinements of the apparatus consists in the formation of the roof or top 17 of the bell or drum with a downward slope from the point where the gas pipe 13 joins it, or from the center toward the circumference, so that any condensed liquid tends to flow toward the side walls and thus to avoid the unwetted carbid, the object being to prevent after generation. Also, in the form of the invention shown, the point of juncture of the pipe 13 with the roof 17 is protected by a baffle 18 adapted to lead any liquid condensed in the pipe away from the carbid. The inner cylinder 3 rests on any suitable support as the horizontal portions of the pipes 8 and 10, or the elbows, and serves in turn as a support for the carbid containers 4. In the present instance, I show a perforated shelf 19 in the inner cylinder which may be inclined forming frustum of a cone, or constructed in any preferred form. This not only acts as a support for the rack 5 carrying the containers 4 but braces the sides of the inner cylinder, making a substantial, light and cheap structure. The rack 5 is constructed of intersecting members, preferably radial plates, supporting one or more receptacles 4. The intersecting members or separators with the inclosing member 3 also serve to make each pocket a separate, individual, completely inclosed receptacle, so that when the apparatus is set up, spilling of the carbid from any pocket is prevented in any position of the apparatus, that is, the plates with the inner cylinder and the pockets themselves form a complete inclosure corresponding to each pocket. Of this inclosure the pocket itself forms the bottom wall, the next pocket above forms the top wall, the two plates and a segment of the cylinder forming the side walls. These pockets in the most highly developed form of the invention are of tapering form with the peak or small end at the bottom. In the claims I have referred to this form of pocket as downwardly tapered. The word tapered is not intended as a limitation to a conical section or uniform taper, but is intended to apply to any reduction of the cross-section from the top toward the bottom. The staggered or helical relation of the pockets or receptacles 4 makes it possible to so place these pockets that they overlap in a horizontal plane, bringing the liquid into contact with the carbid in a number of pockets at the same time preferably the pockets are so arranged that the horizontal cross-section through the material though nearly or substantially constant may have a slight predetermined and usually constant variation increasing toward the top. This may be done by placing the pockets in the form of a helix or spiral of a pitch which decreases toward the top compensating for the normal drop in water pressure, or in other words by increasing the overlap, i. e., placing the pockets nearer together in a vertical direction or otherwise, the amount of live carbid exposed at each level being such that the amount of gas generated corresponds at all times to the demand or withdrawal, and tends to keep the pressure as near as possible constant.

My reference to the pockets as overlapping in a horizontal plane means that such horizontal plane intersects more than one pocket and the expression "vertically overlapping," also applied to the pockets, particularly in the claims, has in effect the same meaning, i. e., that they extend by each other in a vertical direction.

The perforations both in the pockets or baskets and in the support are most liberal in area providing an amply sufficient circulation to keep down the temperature and prevent polymerization. The perforations 24 in the support are preferably arranged adjacent the inclined walls of the pockets causing the water to follow the spiral alinement of the pockets as it rises and falls.

An important feature of the carbid receptacle is that it is easily filled and easily removed from the generator and emptied. The tapering construction gives a large area at the top to support the increased bulk of the material as it is exhausted, and the construction of the pockets tapering toward the bottom tending to reduce the amount of surplus exhausted material that must be supported by the top area of each pocket as compared to a receptacle of uniform section, and the conical shape and staggered relation also provides room for the swelling of the exhausted material i. e. it gives room at the top of each pocket. The rack being made with a series of pockets on a single support permits them to be handled as a unit a grip 20 for this purpose being provided at the top so that all that it is necessary to do when the carbid is exhausted is to remove the drum, pull the rack out of the inner cylinder and invert it, when the exhausted material is easily discharged and new material may be substituted, the new material merely filling the pockets to the level of their upper edges so as to provide room for expansion.

The vent consists of a small tube or passage 21 in the outer gas delivery pipe 14 extending down to a point near the bottom of that pipe, the depth being determined by the desired pressure of the vent. This pipe as shown is near the wall of the outside delivery gas pipe 14 and the vent or opening is in the annular space between the inside stationary pipe in the tank and the outside pipe which leads to the burner or other means of consumption. This vent pipe or passage 21 may be in any form so long as it terminates in the waterseal so as to discharge the gas when the water seal is depressed to the desired level. In the form shown in Fig. 1, the vent pipe leads to the gas cock 15 which has a vent opening 22. This vent opening 22 registers with the passage 25 to the burner when the valve is closed and at this time the corresponding vent opening 26 registers with the port 27 in the valve seat which is the outlet of the vent passage 28. The two vent openings 22 and 26 in the valve are, of course, connected by the main valve passage 29 from which they radiate, the valve being of the ordinary plug type as shown in Figs. 5 and 6, and the valve passages referred to being in the plug 30 and serving to vent surplus gas when the burner is not in operation, the cock being closed. But this type of vent may also be operative when the valve is open and the gas being consumed i. e., if the gas is generated rapidly the pressure rises to a certain predetermined point fixed by the depression of the liquid seal and a certain amount of gas i. e., the excess, if any, over that required by the burner and to maintain the supply in the system, is vented through the valve. For this purpose I provide a port 31 in the valve casing 32, see Fig. 2, which, when the gas valve is closed i. e., the main ports 33 are out of registration with the main passage 25 coöperates with a passage or groove 35 on the circumference of the plug 30 which passage is at the same time i. e. when the main valve is open in registration with the vent port 27, this gives a by-pass or vent for the surplus gas which operates when the pressure reaches a predetermined point i. e., when the seal is depressed to the lower vent opening 36, see Fig. 1.

In Figs. 7 and 8 another form of vent is illustrated which embodies a pipe 37 corresponding to the pipe 21 in Fig. 1 and is similar to the venting device already described, except that instead of permitting the escaping gas to pass through the valve, the pipe 37 terminates in a downwardly disposed opening 39 in a hood or fitting 40 on the pipe provided for this purpose. The opening 39 may within the scope of the invention be turned in any direction and concealed or protected in any suitable manner.

In Fig. 9, I have shown a vent similar to the one last described except that the tube or vent pipe 41 is supported on the outside of the gas pipe leading from the drum to the washer. This vent pipe or tube 41 terminates in a hood 42 on the pipe above the maximum water level. The inlet to the vent at the bottom is in the annular space of the pipe seal just above the lower level of the gas and water as in the case of the other vents described.

The operation of the invention has been fully described in connection with the description of the apparatus, the most important feature being the device for supporting the carbid, consisting of a series of overlapping pockets in staggered, spiral, or helical arrangement in combination with the balanced pressure and gravity feed in which the water rises and recedes in response to the pressure wetting new carbid or receding so that the wetted carbid is drained as the consumption of gas fluctuates requiring faster or slower generation, permitting the rate of generation to respond immediately at the various levels to the rate of demand.

I have thus described the apparatus embodying my invention specifically and in detail in order that its nature and operation may be thoroughly understood, however, these specific terms herein are used in their descriptive, rather than in their limited, sense, and the scope of the invention is defined in the claims.

What I claim, and what I desire to secure by Letters Patent is:

1. In an acetylene generator means for supporting the carbid consisting of a plurality of perforated pockets having a sharp downward taper substantially to a vertex and arranged in a vertically extending series, the pockets overlapping in horizontal planes.

2. In an acetylene generator in combination a submerged drum or bell a gas delivery outlet and means for supporting the carbid in the bell consisting of a plurality of perforated pockets having a sharp downward taper substantially to a vertex and arranged in a vertically extending series, the pockets overlapping in horizontal planes intersecting them at various levels intermediate the top and bottom pockets the horizontal cross-section through the pockets at all levels of normal generation being substantially equal.

3. In an acetylene generator in combination a submerged drum or bell a gas delivery outlet and means of supporting the carbid in the bell consisting of a plurality of perforated pockets tapering downwardly substantially to a vertex, the same being in a vertically extending series the pockets overlapping in a horizontal plane and arranged to give a slightly increasing but almost constant cross-section of carbid at each successive level from the bottom to the top of the material, the water being fed from beneath and controlled in its relation to the material by the pressure fluctuations in the bell.

4. In an acetylene generator in combination a submerged drum or bell open at the bottom and a holder for carbid therein consisting of a plurality of perforated pockets having a sharp downward taper substantially to a vertex and arranged in a vertically extending series, the pockets overlapping in each horizontal plane between the middle portions of the upper and lower pockets, giving a substantially constant horizontal cross-section of material exposed to the water at all levels between the top and bottom pockets the water being fed from below and submerging the carbid and uncovering it as it rises and falls in response to variations of pressure in the bell.

5. In an acetylene generator in combination a submerged drum or bell and a holder for carbid therein consisting of a plurality of perforated pockets having a sharp downward taper substantially to a vertex and arranged in vertically extending series and overlapping in each horizontal plane between the middle portions of the upper and lower pockets the respective pockets forming a helix or spiral.

6. In an acetylene generator means for supporting the carbid in a form of a plurality of pockets having a sharp downward taper substantially to a vertex and arranged in a vertically extending series and in staggered relation to overlap in each horizontal plane between the middle of the upper and lower pockets.

7. In an acetylene generator the means for supporting carbid consisting of a plurality of radially intersecting perforated plates and a plurality of perforated pockets tapered downwardly at a sharp angle substantially to a vertex secured to the plates and arranged in overlapping relation between the plates.

8. In an acetylene generator the means for supporting carbid consisting of a plurality of radially intersecting perforated plates and a plurality of perforated pockets tapered downwardly substantially to a vertex and arranged supported on and between the plates, the pockets being in vertically extending series and arranged to overlap in the various intersecting horizontal planes between the middle portions of the upper and lower pockets.

9. In an acetylene generator in combination a carbid holder consisting of a plurality of radiating members and a series of perforated pockets tapered downwardly substantiallly to a vertex and supported thereon in vertically overlapping relation.

10. In an acetylene generator in combination a carbid holder consisting of a plurality of radiating members and a series of perforated pockets tapered downwardly substantially to a vertex and supported thereon, between the radiating members, in vertically overlapping relation, and helically arranged.

11. In an acetylene generator in combination a carbid holder consisting of a plurality of radiating members and a series of perforated pockets tapered downwardly substantially to a vertex and supported thereon, the pockets being in the vertices, and helically arranged and overlapping in each horizontal plane between the middle of the upper and lower pockets, respectively, such horizontal cross sections through the material thus supported being substantially equal at the various levels.

12. In an acetylene generator in combination a submerged bell or drum an inner cylinder open at the bottom a plurality of perforated pockets having a downward taper substantially to a vertex and being placed within the inner cylinder, the same being arranged in a vertically extending series and overlapping in an intersecting horizontal plane between the middle portions of the upper and lower pockets.

13. In an acetylene generator a submerged bell or drum an inner inclosure open at the bottom and having an inclined annular support, a rack on said support and a vertically extending series of pockets on said rack, the pockets being overlapped in intersecting horizontal planes.

14. In an acetylene generator a submerged bell an inner cylinder open at the bottom and having an annular support for the carbid containers in the form of a frustum of a cone, a rack on the support, and a series of pockets for carbid on the rack.

15. In an acetylene generator a submerged bell an inner cylinder open at the bottom and having an annular support for the carbid containers in the form of a frustum of a cone, a rack on the cone, and a series of pockets on the rack arranged in a vertically extending series, the pockets being overlapped in the intersecting horizontal planes.

16. In an acetylene generator means for supporting the carbid in the form of a rack having a plurality of pockets arranged in a spiral, the rack also having perforations in spiral alinement corresponding to the arrangement of the pockets and adjacent to walls thereof.

17. In an acetylene generator a support for carbid consisting of a rack a plurality of downwardly tapered and vertically overlapping pockets supported thereby, the pockets being arranged in a helix or spiral of decreasing pitch toward the top.

18. In an acetylene generator a support for carbid consisting of a plurality of pockets means supporting the same in vertically extending series the successive pockets being out of alinement in a vertical direction and overlapped to present a cross-section of carbid increasing from bottom to top.

19. In an acetylene generator a support for carbid including a series of pockets, the pockets being tapered downwardly substantially to a vertex and overlapping in horizontal planes and arranged on a helix or spiral.

20. A carbid holder consisting of a series of pockets at different levels, the walls of the pockets being inclined, effecting a reduction in cross-section toward the bottom of the individual pockets, means supporting the pockets in staggered and overlapping relation to effect uniform generation, some of the pockets overhanging others and being spaced from those below providing clearance for expansion of carbid during combustion and easy filling and emptying of the pockets.

21. In a carbid holder, a series of pockets, means supporting and holding the pockets at different levels and in overlapping relation, some of the pockets overhanging others and having their outer walls inclined and spaced from the pockets below to give clearance for filling and emptying.

22. In a carbid holder, a series of pockets at different levels and in overlapping relation, some of the pockets overhanging others, the walls of the overhanging pockets being inclined and spaced from those below, divisional walls between the pockets and inclosing means coöperating to form for each pocket a closed receptacle.

Signed by me at Baltimore, Maryland, this 2d day of August, 1917.

ALEXANDER F. JENKINS.

Witnesses:
LAWRENCE W. MOLTZ,
C. D. EVANS.